(12) United States Patent
Brickett

(10) Patent No.: US 7,254,917 B2
(45) Date of Patent: Aug. 14, 2007

(54) FISHING LURE

(75) Inventor: Benjamin P. Brickett, Eliot, ME (US)

(73) Assignee: Blue Water Concepts, Inc., Eliot, ME (US)

( * ) Notice: Subject to any disclaimer, the term of this patent is extended or adjusted under 35 U.S.C. 154(b) by 0 days.

(21) Appl. No.: 10/295,174

(22) Filed: Nov. 15, 2002

(65) Prior Publication Data

US 2003/0066230 A1  Apr. 10, 2003

Related U.S. Application Data

(63) Continuation-in-part of application No. 09/709,104, filed on Nov. 10, 2000, now abandoned.

(51) Int. Cl.
*A01K 85/00* (2006.01)

(52) U.S. Cl. .................. 43/42.02; 43/42.04; 43/43.16

(58) Field of Classification Search ............... 43/42.02, 43/42.72, 42.39, 42.24, 42.06, 42.04, 43.16
See application file for complete search history.

(56) References Cited

U.S. PATENT DOCUMENTS

| | | | |
|---|---|---|---|
| 62,042 A | 2/1867 | Lee, Jr. | |
| 1,241,707 A | 10/1917 | Capooch | |
| 1,296,057 A | 3/1919 | Ellsworth | |
| 2,147,917 A | 2/1939 | Noren | |
| 2,488,475 A | 11/1949 | Merritt | |
| 2,606,390 A | 8/1952 | Farmer | |
| 2,631,401 A | 3/1953 | Kritzer | |
| 2,665,903 A | 1/1954 | Green | |
| 2,731,758 A | 1/1956 | Coe | |
| 2,979,849 A | 4/1961 | Anerson | |
| 3,006,102 A | 10/1961 | Chapman | |
| 3,774,336 A * | 11/1973 | Dubois | 43/42.72 |
| 4,126,957 A * | 11/1978 | Randall | 43/43.16 |
| 4,514,926 A | 5/1985 | Weber, Sr. | |
| 4,748,763 A * | 6/1988 | Giraudo et al. | 43/42.72 |
| 4,794,722 A * | 1/1989 | Crevoisier | 43/42.72 |
| 4,843,755 A * | 7/1989 | Lin | 43/42.72 |
| 4,982,524 A * | 1/1991 | Vissing | 43/42.02 |
| 5,025,586 A * | 6/1991 | Pixton | 43/42.24 |
| 5,152,094 A * | 10/1992 | Strickland | 43/42.24 |
| 5,335,441 A * | 8/1994 | Blackwell | 43/42.36 |
| 5,490,345 A * | 2/1996 | Infinger | 43/42.39 |
| 5,950,347 A * | 9/1999 | McQueeny | 43/42.04 |

* cited by examiner

*Primary Examiner*—Kurt Rowan
(74) *Attorney, Agent, or Firm*—Hayes Soloway PC

(57) ABSTRACT

This fishing invention applies a kinetic energy-storing device along a fishing line to provide additional resistance to short-term stress applied to the line when the fish is tugging. The kinetic energy-storing device reduces occurrences of fishing line breakage, allows fishermen to use a lighter fishing line, and creates a means for fishing lures to snap themselves off of undersea objects. This invention, when secured between the fishing line and lure, allows fishermen to change lures without the need to retie the lure. Ultimately, this invention makes it more difficult for a fish to escape once hooked.

2 Claims, 5 Drawing Sheets

FISHING LURE

The present invention claims priority as a continuation-in-part application, based upon patent application Ser. No. 09/709,104 filed Nov. 10, 2000 now abandoned.

FIELD OF THE INVENTION

This invention relates to the field of recreational and commercial fishing apparatus. Specifically to an improved fishing lure.

BACKGROUND OF THE INVENTION

This invention applies to the recreation of fishing. The well-known practice of recreational fishing involves a fisherman, a fishing rod and reel, a fishing line, a fishing lure, and, with any luck, at least one fish. A fisherman uses the rod, reel and line to cast the lure into the water. When a fish bites the lure, the fisherman uses the rod and reel to pull on the line and retrieve the lure with the fish in tow.

This simplified, traditional method of fishing contains several hurdles. One hurdle for fishermen is keeping the fish from getting away. Once the fish is hooked, the fish will normally begin pulling on the line. This pulling on the line can cause the line to break, the line to disengage from the lure, or the fish to disengage from the lure. Any of these results will allow the fish to get away, thereby frustrating the fishermen.

Breaking the line while casting is another problem fishermen can have. The lighter the fishing line, the less force the line can withstand. Fishermen put a challenging load on a fishing line when trying to cast a great distance and depending on the weight of the lure and the size of the fishing line, the line can snap under the force of casting. As fishermen prefer to be able to cast a great distance, the limitation imposed by the strength of the line can be a detriment to casting distance.

One method of overcoming the possibility of the fishing line breaking is getting a thicker, stronger fishing line. However getting a thicker, stronger fishing line means the line is also heavier. The heavier the fishing line, the shorter the distance a fisherman can cast her line. The shorter the distance the fisherman can cast her line, the lower her range to cast circumferentially. Fishermen prefer to be able to sit still when fishing and hit any visible location in the water where they suspect the fish are apt to be. Therefore, this method of overcoming the fishing line breakage problem frustrates most fishermen.

Another problem fishermen have is the hooks of the lure getting caught on undesirable undersea objects, such as rocks. When the lure gets caught on these undersea objects, the fisherman must tug on the lines in hopes of freeing the lure. If the lure is sufficiently secured to the undersea object, the fisherman will either break the line tugging or must cut the line to free his rod and continue fishing. Either method results in the loss of the lure and some portion of the line. In an ideal situation, the fishing lure could avoid being caught in this situation.

A final problem fishermen have is trying to change lures while fishing. Recreational fishing is often performed before dawn and in a wide range of temperatures. When the fish are not responding to one type of lure or a fisherman simply wants to try out another lure, the lure in use must be cut from the fishing line and a new lure tied. It can be difficult to thread and tie the new lure when lighting conditions are poor and a fisherman's hands are partially numb from the temperature. Changing lures would be easier if it did not require tying on the new lure. This is a problem for fishermen. Presently there are line snaps on the market, which are intended to alleviate this problem, but they exist on the outside of the lure and tend to detract from the performance of the lure. Preferably, a fishing lure could be changed from a fishing line without needing to retie the new fishing lure and without detracting from the performance and/or appearance of the lure. Ideally the fishing lure could be modified and customized, with weights and other accessories, without needing to retie the lure to the fishing line.

SUMMARY OF THE INVENTION

This invention results from the realization that tying and retying lures to fishing lines, while fishing, is an unnecessary inconvenience that can be alleviated by using an elastic member in the lure to reduce the stress on the fishing line, protecting the leader, and devising an intermediary to connect the lure to the fishing line without retying the fishing line.

It is therefore an object of one embodiment of this invention to reduce the occurrence of breaks in fishing lines as a result of fish tugging on the line.

It is a further object of one embodiment of this invention to reduce the occurrence of breaks in fishing lines as a result of fishing lure getting caught on undersea objects.

It is a further object of one embodiment of this invention to make changing lures on fishing lines easier.

It is a further object of one embodiment of this invention to allow fishermen to cast their lines further.

It is a further object of one embodiment of the present invention to protect the leader.

BRIEF DESCRIPTION OF THE DRAWINGS

These and other features and advantages of the present invention will be better understood by reading the following detailed description, taken together with the drawings.

DETAILED DESCRIPTION OF THE INVENTION

Figure 1:
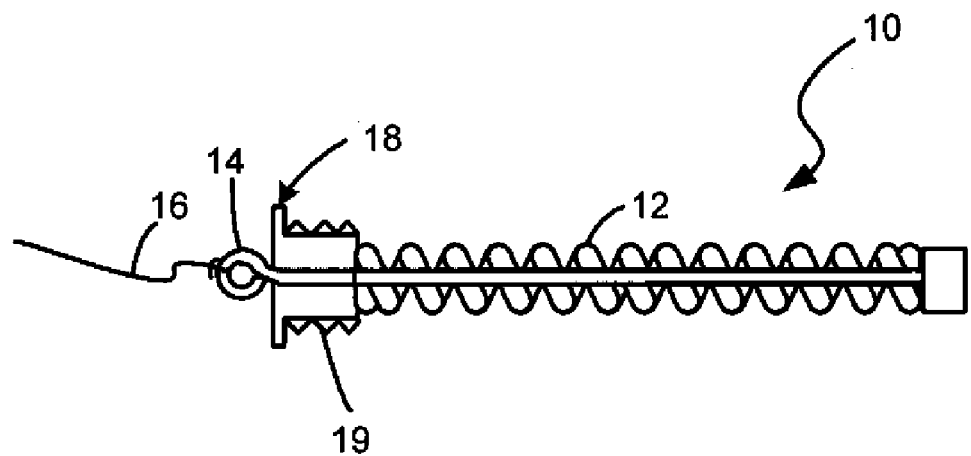
FIG. 1 shows a cross-section of one embodiment of the present invention.

This invention is a fishing device 10, FIG. 1, for eliminating the need to continually retie fishing lures to fishing lines while fishing. The fishing device 10 includes an elastic member 12. The elastic member 12 is primarily a spring in the attached drawings, but other devices with similar mechanical properties are known to those skilled in the art. The fishing device 10 further includes a first securing member 14 attached to the elastic member 12 and attachable to fishing line 16. The first securing member 14 is a leader in the embodiment shown in FIG. 1. Finally, the fishing device 10 includes a second securing member 18 attached to the elastic member 12 and directly, removably fastenable to a fishing lure 20.

The fishing device 10 avoids simply tying and retying the fishing lure 20 to the fishing line 16 in a number of ways. The most obvious way the fishing device 10 avoids tying and retying is through the second securing member 18. While the fishing device 10 remains tied to the fishing line 16, the second securing member 18 can be fastened and unfastened to a variety of fishing lures 20 without ever needing to tie additional fishing line 16. In one embodiment, the second securing member 18 is threadably fastened to the fishing lure 20, although those skilled in the art are capable of devising other tactile fastening means. The removable fastening ability between the second securing member 18 and the fishing lure 20 is one way this fishing device 10 avoids tying and retying fishing line while fishing.

Another way the present invention avoids tying and retying fishing line while fishing is through the elastic member 12. While fishing, it is not unusual to have the fishing line 16 break or otherwise detach from the fishing lure 20 when a fish is caught on the lure 20 or the lure 20 is caught on something at the bottom of the water. With the present device, the elastic member 12 prevents these types of mishaps. When a fish is caught, it pulls on the fishing lure with quick, strong bursts of force. Instead of the fishing line 16 bearing the brunt of this force, the elastic member 12 absorbs the tugs, which reduces the strain on the fishing line 16 and the likelihood of the fishing line snapping. Also, if the lure 20 is caught on an inanimate object, pulling the fishing line 16 tight will engage the elastic member 12 and releasing the fishing line 16 will cause the fishing lure 20 to lurch from the inanimate object like a slingshot. This feature reduces the likelihood of the fishing line 16 breaking while caught on the inanimate object and also reduces the need to cut the fishing line 16 as a result of being caught on an inanimate object. Therefore, the elastic member 12 avoids the requirement of tying and retying the fishing line 16.

Figure 2:
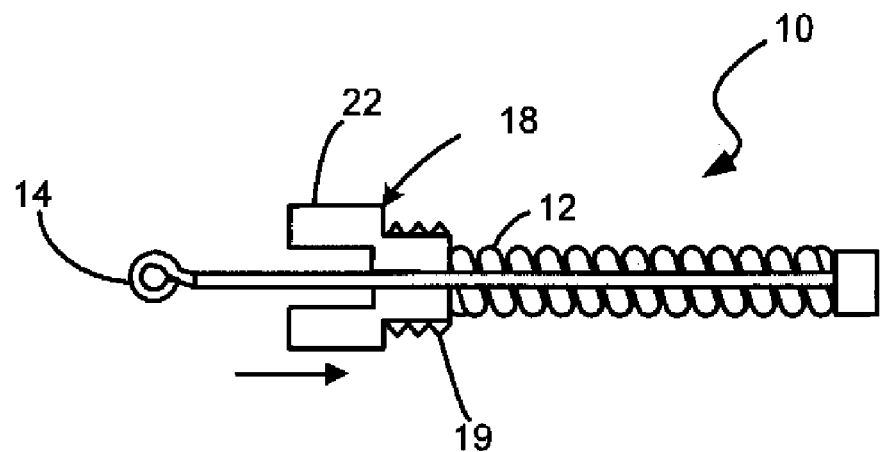
FIG. 2 shows a cross-section of one embodiment of the present invention.

An additional embodiment of the present invention protects the fishing line 16 on the first securing member 14. In this embodiment, a slideable chamber 22 overlaps the first securing member 14. Preferably the chamber 22 is connected to the elastic member 12 and slides relative to the first securing member 14 by engaging the elastic member 12, as shown in FIG. 2. When the elastic member 12 is at rest, chamber 22 overlaps the first securing member 14. By overlapping the first securing member 14, the chamber 22 protects the first securing member 14 from damage and protects the fishing line 16 at the first securing member 14. Also, the first securing member 14 may distract the fish from the lure 20 if not hidden by the chamber 22.

An additional embodiment of the present invention involves attaching a balance point weight 24 to the fishing device 10. The balance point weight 24 is used when the lure 20 is likely to be touching and/or dragged along the bottom of the water. In that circumstance, the balance point weight 24 will be the fishing device 10 and lure 20 and, thereby, stay lowest to the ground, propping the hook 26 on the lure 20 off the water bottom. Dragging the lure 20 along the water bottom in this position reduces the chance of catching the hook 26 on an inanimate object. One method of attaching the weight 24 to the fishing device 10 would be threadably attaching it to the second securing member 18 before the lure 20, using the securing member threads 19 and the lure threads 21. The fishing device 10 could also have a tactile securing element for receiving the weight 24, which could easily be constructed by one skilled in the art. Preferably, the elastic member 12 is loosely inserted through an opening in the weight 24 and the weight 24 is removably secured when the lure 20 is fastened to the second securing member 18.

Figure 3:
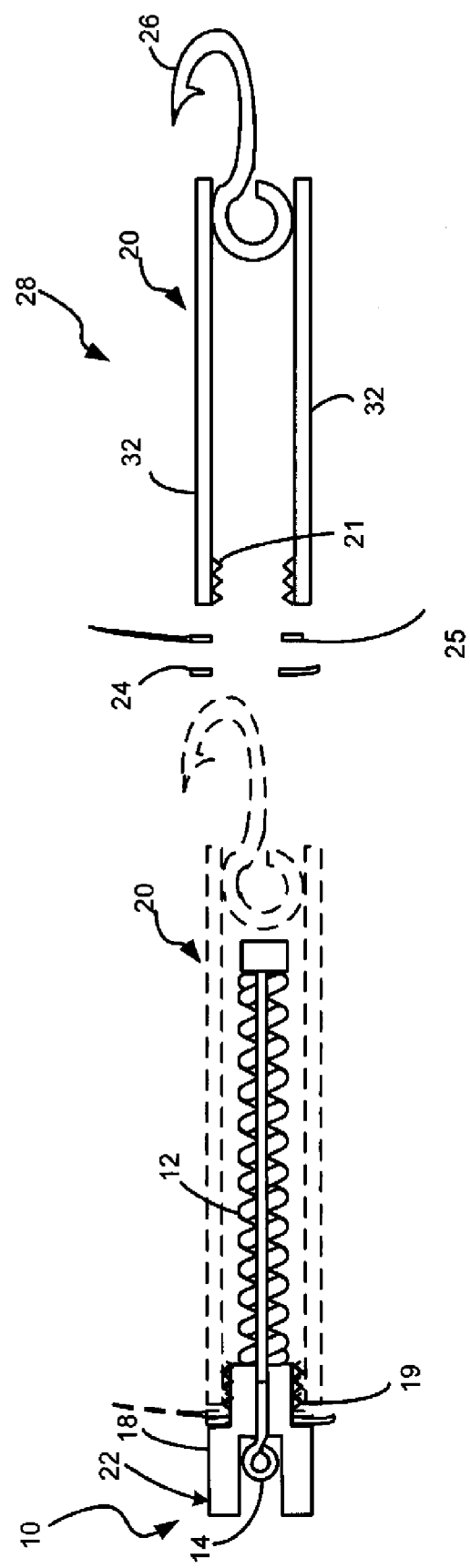
FIG. 3 shows an exploded view of one embodiment of the present invention.

Additional attachments may be designed and similarly secured to the fishing device 10. One additional attachment would be a weed protector 25, as portrayed in FIG. 3, a slender attachment that protrudes as far as the lure 20 for the purpose of keeping the lure 20 from catching on underwater weeds.

Figure 4:
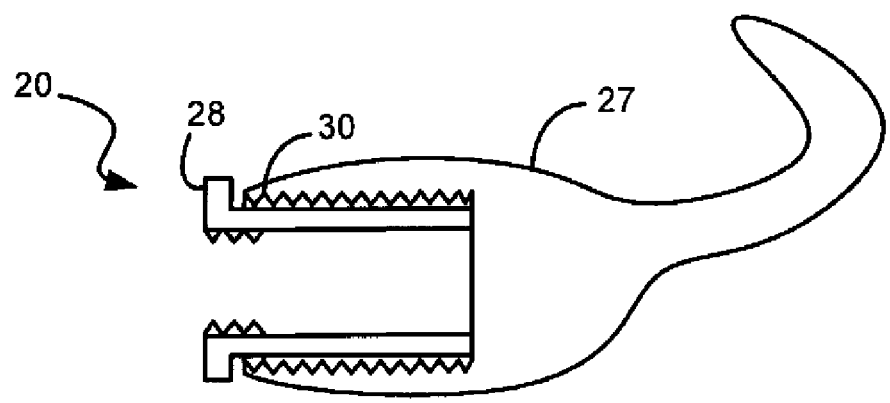
FIG. 4 shows a cross-section of one embodiment of an insert.
Figure 5:
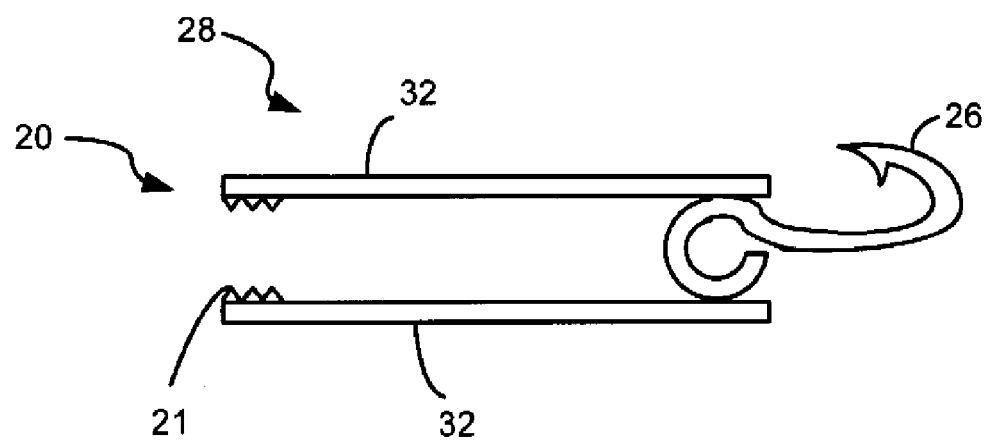
FIG. 5 shows a cross-section of one embodiment of an insert.
Figure 6:
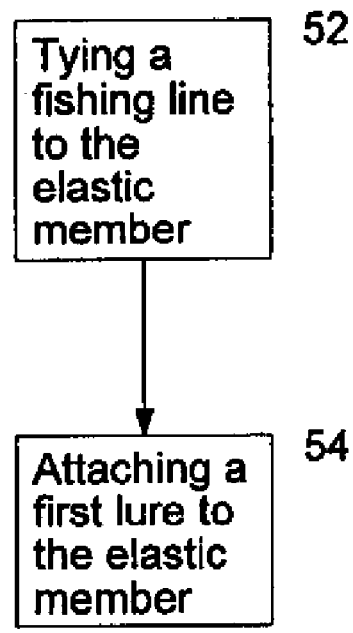
FIG. 6 shows a flow diagram of one embodiment of the present invention.
Figure 7:
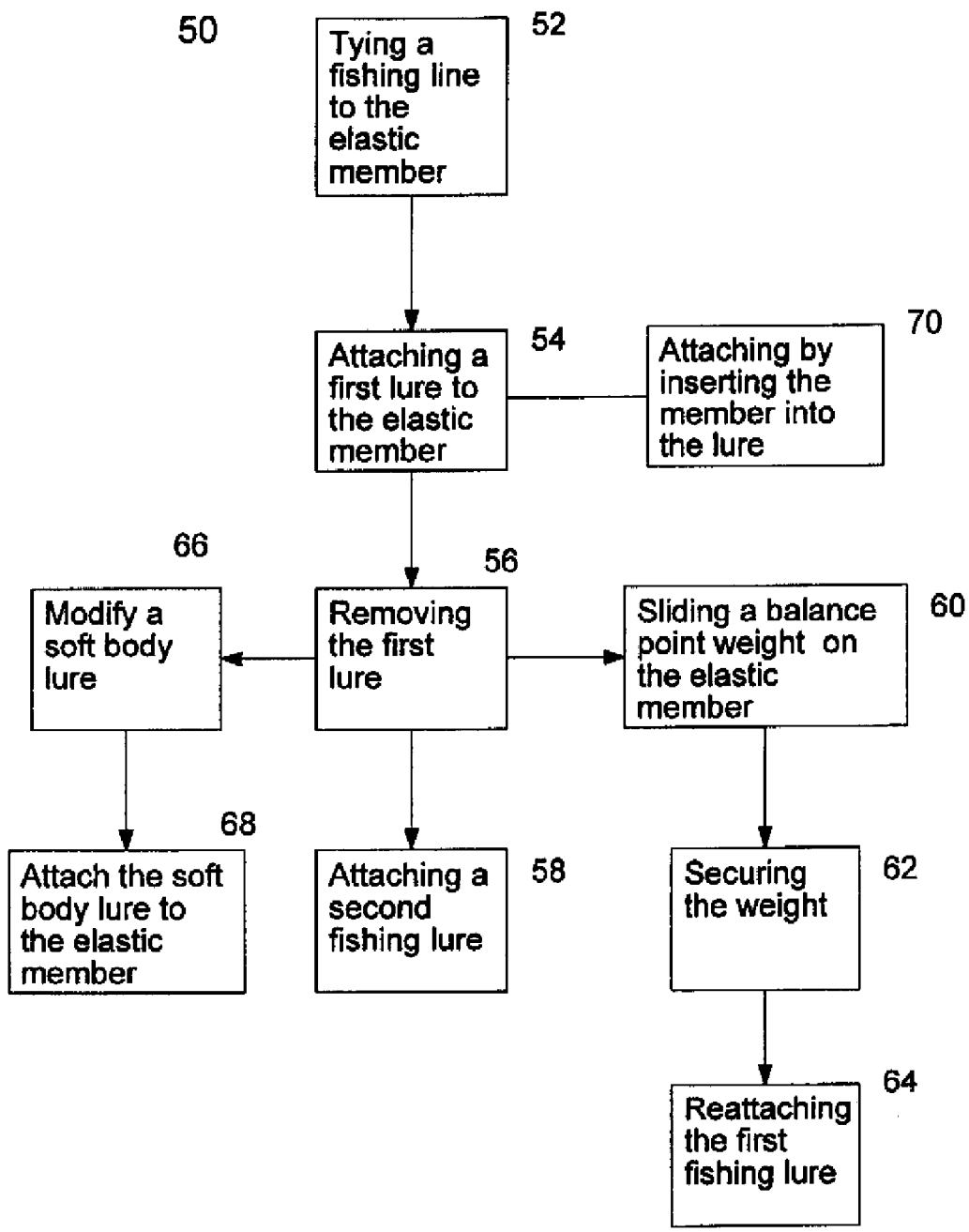
FIG. 7 shows a flow diagram of one embodiment of the present invention.

To utilize the present invention, a fishing lure 20 must be used that is adapted or manufactured with the ability to fasten to the second fastening member 18. A soft body lure 27 can be easily adapted to fasten to the second fastening member 18 by using an insert 28. The insert 28 is designed for tactile connection to the soft body lure 27 and is mateable with the second fastening member 18. FIGS. 4 and 5 show two prospective insert embodiments. FIG. 4 shows an insert 28 with deep threads 30 for twisting into and gripping the soft body lure 27. FIG. 5 shows an insert 28 with a smooth outer surface 32 and a hook 26 on one end of the insert 28. The insert 28 shown in FIG. 5 slides into the soft body lure 27 and uses the hook 26 to keep the soft body lure 27 from sliding off. Other inserts 28 may be designed by those skilled in the art.

In another embodiment, the elastic member 12 is insertable within the fishing lure 20. By inserting the elastic member 12 inside the fishing lure 20, the elastic member 12 is not a distraction to the fish and is less likely to be damaged. This arrangement is also more aesthetically pleasing to the fisherman because it visually resembles the traditional arrangement of tying the lure 20 directly to the fishing line 16.

The present invention is also a novel method 50 of using a fishing lure. The first step in the novel method 50 is tying 52 a fishing line to an elastic member. The next step is directly, removably attaching 54 a first fishing lure to the elastic member. The step of attaching 54 does not require separate fishing line or other extra parts that are not permanently connected to the elastic member or the fishing lure.

In one embodiment, the method 50 further includes the step of removing 56 the first fishing lure from the elastic member and directly, removably attaching 58 a second lure to the elastic member.

In another embodiment, the method 50 further includes the steps of removing 56 the first fishing lure from the elastic member, sliding 60 a balance point weight along the elastic member and securing 62 the weight by directly, removably reattaching 64 the first fishing lure to the elastic member. This novel embodiment allows fishermen to efficiently, nonpermanently customize their lures while fishing, allowing them to adapt their lures to the elements.

In another embodiment, the method 50 further includes a few additional steps. The first additional step is removing 56 the first fishing lure from the elastic member. The next step is modifying 66 a soft body lure with an insert to create a modified fishing lure. The final additional step is directly, removably attaching 68 the modified fishing lure to the elastic member.

In another embodiment, the step of attaching 54 involves threadably attaching the first fishing lure to the elastic member.

In another embodiment, the step of attaching 54 further includes sliding 70 a substantial portion of the elastic member into the first fishing lure.

Modifications and substitutions by one of ordinary skill in the art are considered to be within the scope of the present invention, which is not to be limited except by the following claims.

We claim:

1. A fishing apparatus comprising:
   an elastic member;
   a first securing member attached to the elastic member and attachable to a fishing line;
   a second securing member attached to the elastic member, wherein the elastic member slideably connects the first securing member to the second securing member, the second securing member further having a member threaded portion;
   an insert having a hook and an insert threaded portion mateable with the member threaded portion wherein mating the insert threaded portion with the member threaded portion attaches the hook to the elastic member; and
   wherein the elastic member is insertable within the insert thereby further protecting the elastic member from the elements.

2. The fishing apparatus of claim 1 further comprising a balance point weight removably attachable between the first securing member and the insert.

* * * * *